(12) United States Patent  
Piket

(10) Patent No.: US 8,752,960 B2  
(45) Date of Patent: Jun. 17, 2014

(54) AID FOR TRAINING VISUAL SKILLS ASSOCIATED WITH A SELECTED ACTIVITY

(76) Inventor: Dave Piket, Calgary (CA)

( * ) Notice: Subject to any disclaimer, the term of this patent is extended or adjusted under 35 U.S.C. 154(b) by 170 days.

(21) Appl. No.: 13/326,530

(22) Filed: Dec. 15, 2011

(65) Prior Publication Data

US 2012/0154743 A1   Jun. 21, 2012

Related U.S. Application Data

(60) Provisional application No. 61/433,557, filed on Jan. 18, 2011.

(30) Foreign Application Priority Data

Dec. 16, 2010   (CA) ........................................ 2725679

(51) Int. Cl.
*A61B 3/00*   (2006.01)

(52) U.S. Cl.
USPC .......................................... 351/203; 351/246

(58) Field of Classification Search
USPC .......................................... 351/200, 203, 246
See application file for complete search history.

(56) References Cited

U.S. PATENT DOCUMENTS

2009/0260426 A1* 10/2009 Lieberman et al. .......... 73/65.01

* cited by examiner

*Primary Examiner* — James Greece
(74) *Attorney, Agent, or Firm* — Davis & Bujold, PLLC

(57) ABSTRACT

A method and associated aid for training visual skills associated with a selected activity. The method is grounded upon a theory which involves a first concept referred to as a "planes of reference box" and a second concept referred to as a "momentum triangle". The method involves mounting to a head of a wearer a transparent viewing surface through which the wearer observes his or her environment. The transparent viewing surface has activity specific balance reference indicia from the planes of reference box and activity specific momentum reference indicia from the momentum triangle.

13 Claims, 17 Drawing Sheets

US 8,752,960 B2

1

AID FOR TRAINING VISUAL SKILLS ASSOCIATED WITH A SELECTED ACTIVITY

FIELD

The present disclosure is related to the field of training aids for sports and other activities.

BACKGROUND

When doing any type of activity including walking or various sports, it is often advantageous to move in a certain way or focus on specific objects or locations. For example, during downhill skiing, focusing in the distance provides a skier with additional reaction time as objects are seen at a greater distance. What is required is an aid that can help people focus on important objects or locations during specific activities.

SUMMARY

There is described a theory for training visual skills associated with a selected activity. This theory involves a first concept referred to as a "planes of reference box" and a second concept referred to as a "momentum triangle".

According to one aspect there is provided a method for training visual skills associated with a selected activity. The method involves mounting to a head of a wearer a transparent viewing surface through which the wearer observes his or her environment. The transparent viewing surface has activity specific balance reference indicia from the planes of reference box and activity specific momentum reference indicia from the momentum triangle.

According to another aspect there is provided an aid for training visual skills associated with a selected activity. A body is provided having a mounting for attaching to a head of a wearer and a transparent viewing surface through which the wearer observes his or her environment. Activity specific balance reference indicia are positioned on the transparent viewing surface for visual alignment with the environment. The activity specific balance reference indicia are drawn from the planes of balance reference box concept. They include at least one of a third eye focal point, a chin focal point, a horizon line, a left side plane, a right side plane, and a pendulum line. Activity specific momentum reference indicia are also positioned on the transparent viewing surface to direct a visual focus of the wearer during movement. The activity specific momentum reference indicia is drawn from the momentum triangle concept. They include at least one of a face line, a shoulder line, a waist line, a knee line, base line, one or more momentum lines and triangle lines.

BRIEF DESCRIPTION OF THE DRAWINGS

These and other features will become more apparent from the following description in which reference is made to the appended drawings, the drawings are for the purpose of illustration only and are not intended to be in any way limiting, wherein.

2

Figure 5:
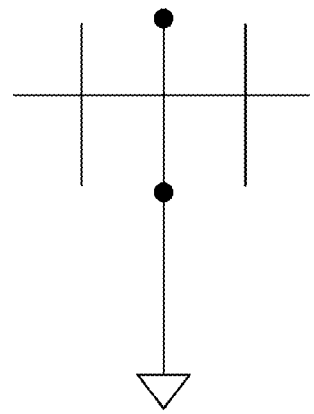

FIG. 5 is a front plan view of balance references placed on the horizon.

Figure 6:
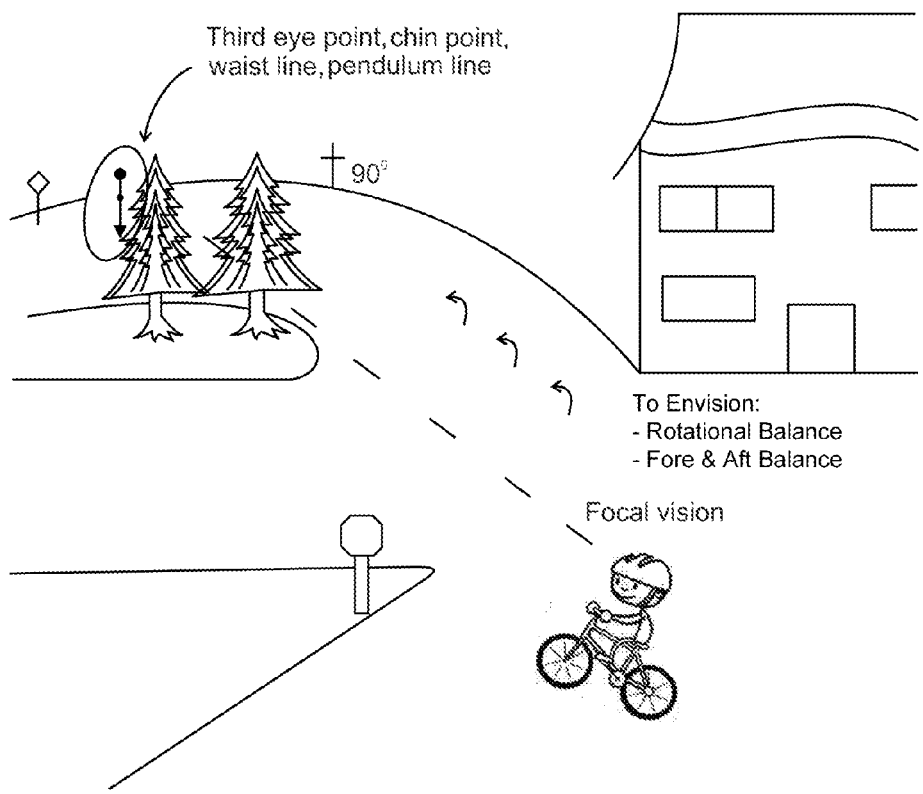

FIG. 6 is a plan view of how the balance references may be understood by a user.

Figure 7:
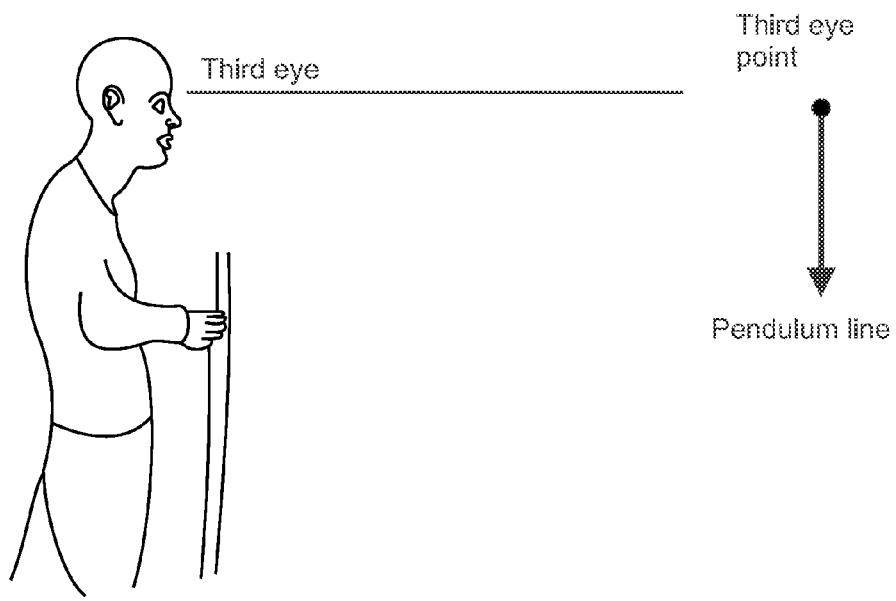

FIG. 7 is a side elevation view of the placement of the third eye point reference.

Figure 8:
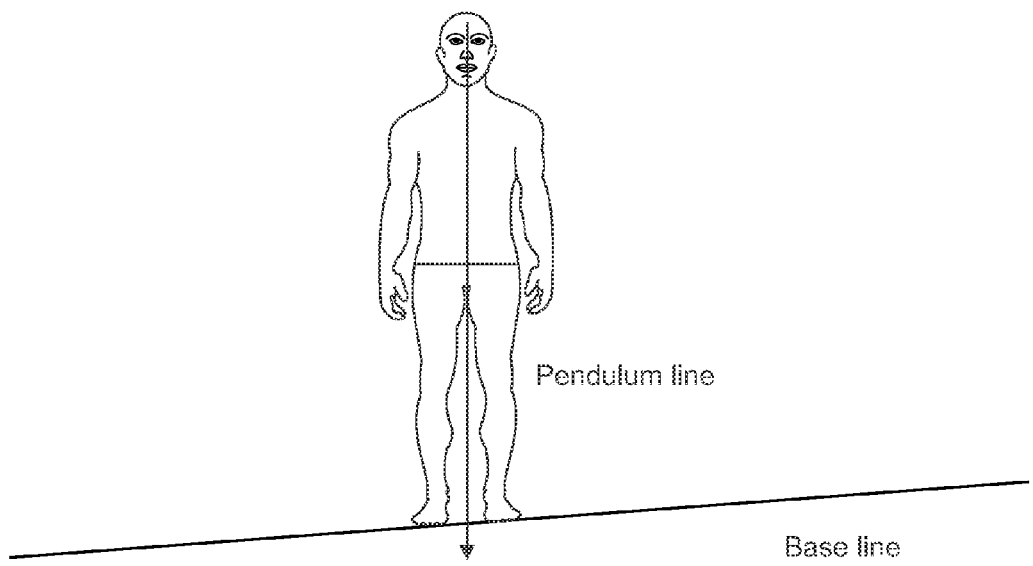

FIG. 8 is a side elevation view of the placement of a pendulum line in reference to a base line.

Figure 9:
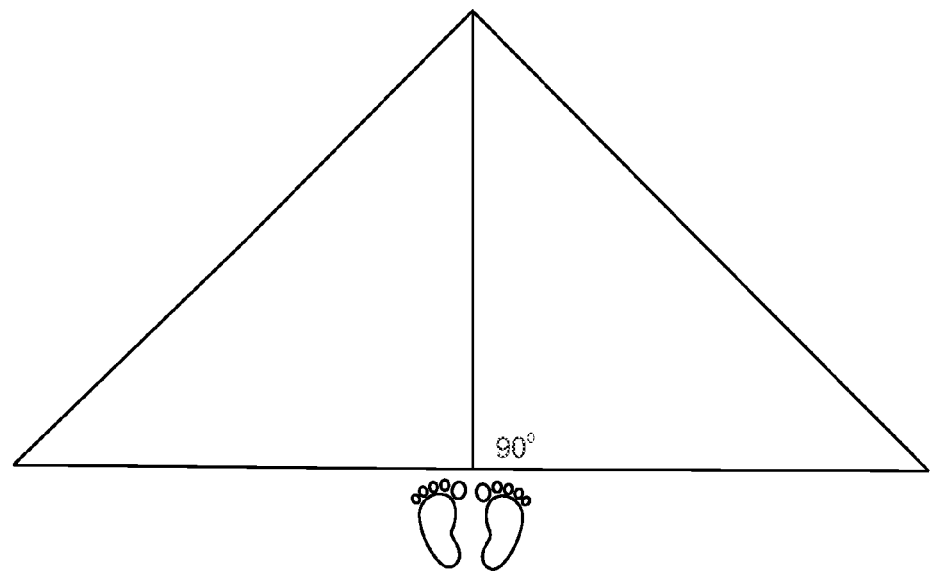
Figure 10:
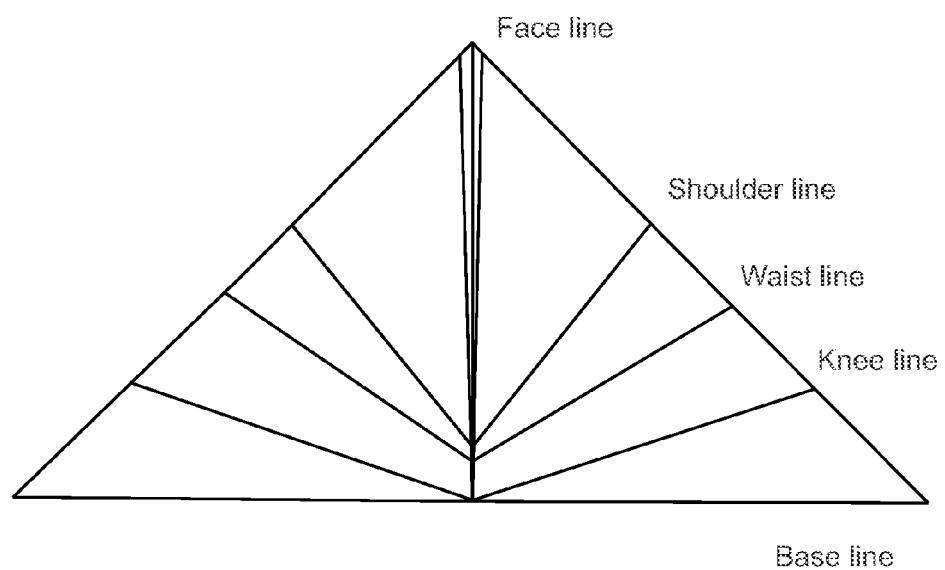

FIG. 9 is a top plan view of the placement of a user's feet in reference to the base line on a momentum triangle FIG. 10 is a top plan view of a momentum triangle with reference lines.

Figure 11:
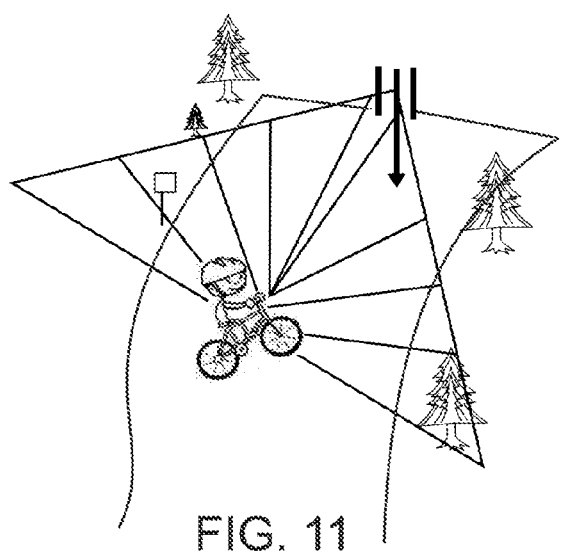

FIG. 11 is a top plan view of a momentum triangle in use.

Figure 12:
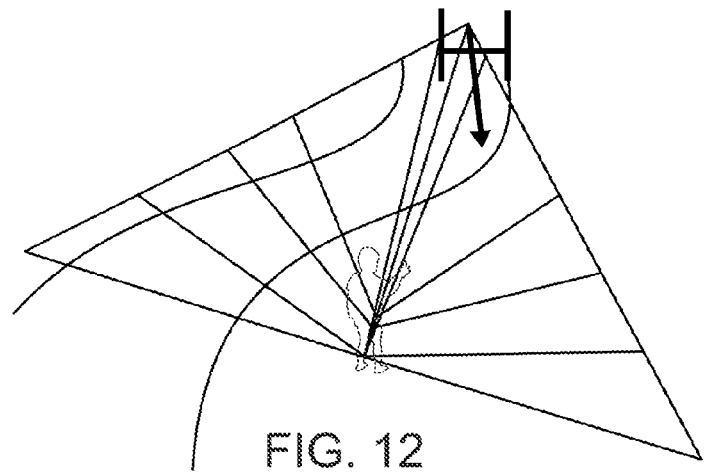

FIG. 12 is a top plan view of a momentum triangle in a second environment in use.

Figure 13:
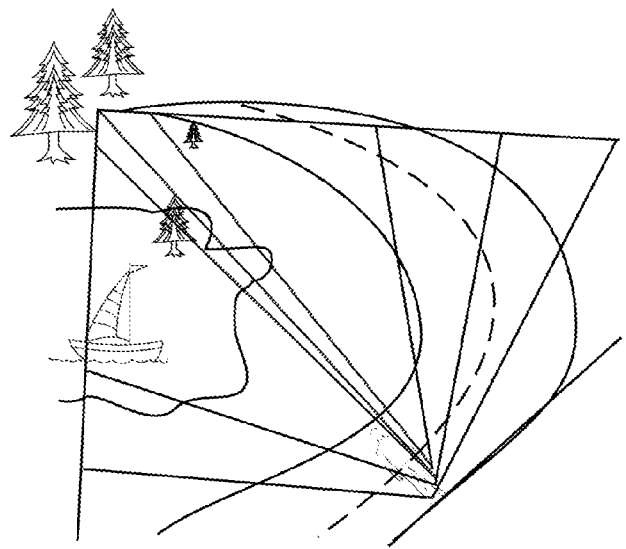

FIG. 13 is a top plan view of a momentum triangle in a third environment in use.

Figure 14:
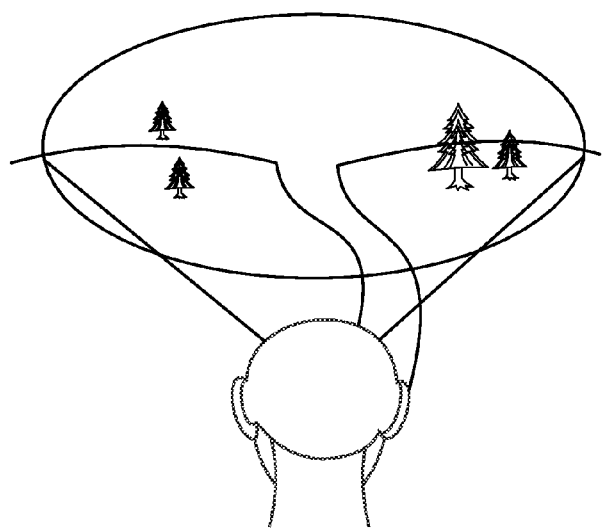

FIG. 14 is a plan view of the shape of focal vision.

Figure 15:
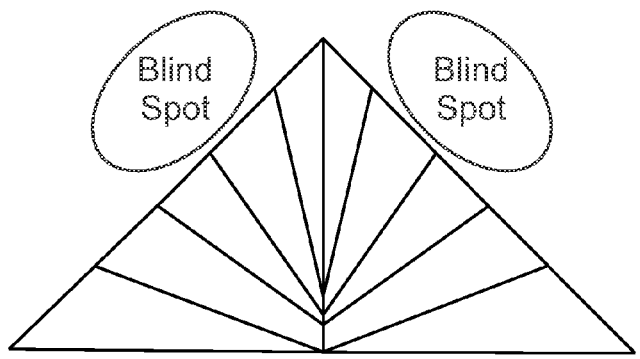

FIG. 15 is a top plan view of a momentum triangle indicating blind spots.

Figure 16:
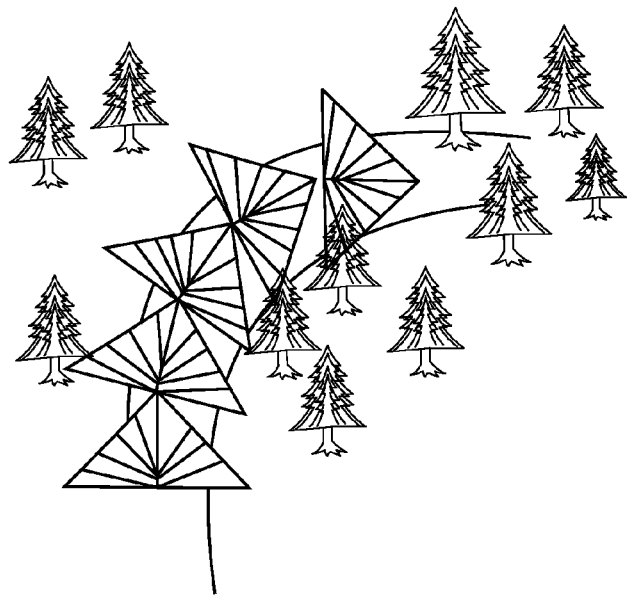

FIG. 16 is a top plan view of several momentum triangles being used to navigate a particular environment.

Figure 17:
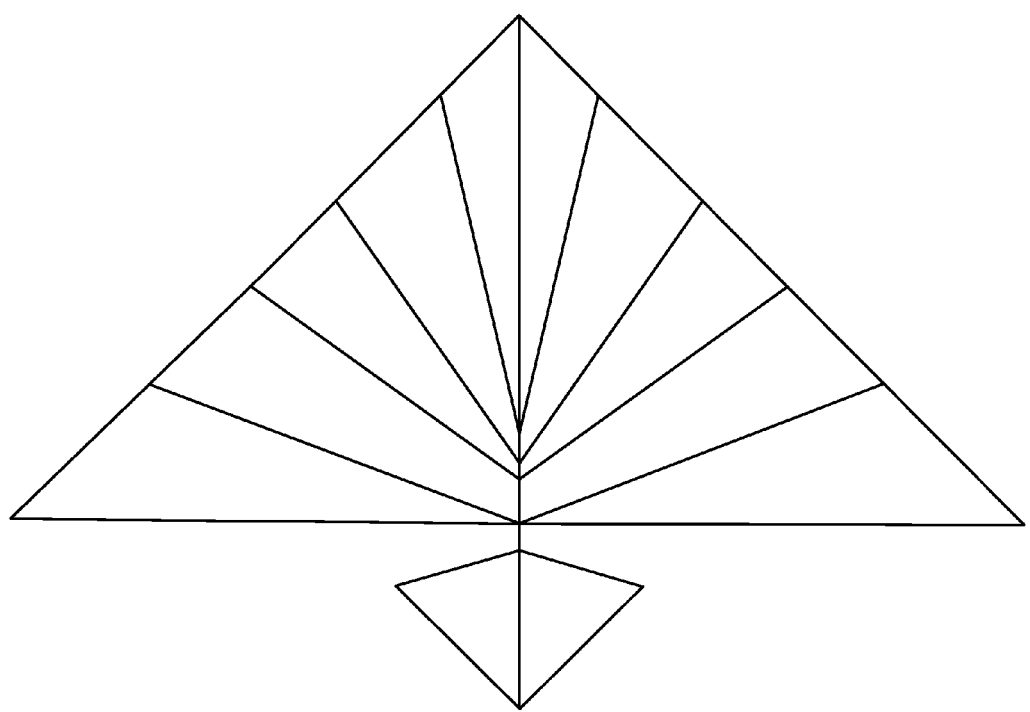

FIG. 17 is a top plan view of a momentum triangle with a backward extension.

Figure 18:
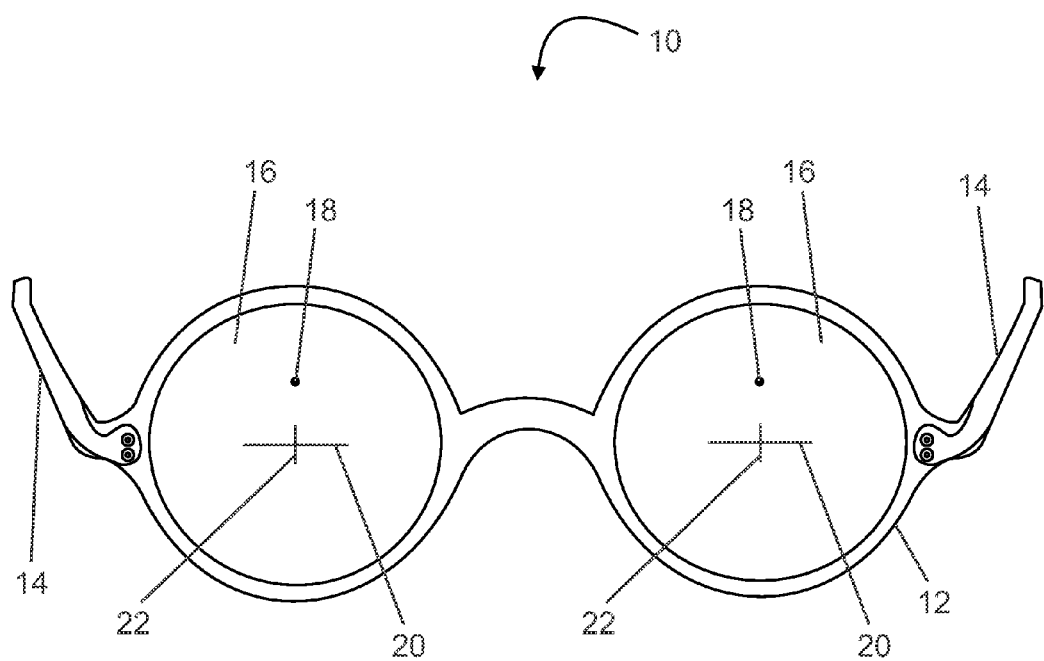

FIG. 18 is a side elevation view of an aid for training visual skills associated with selected activities.

Figure 19:
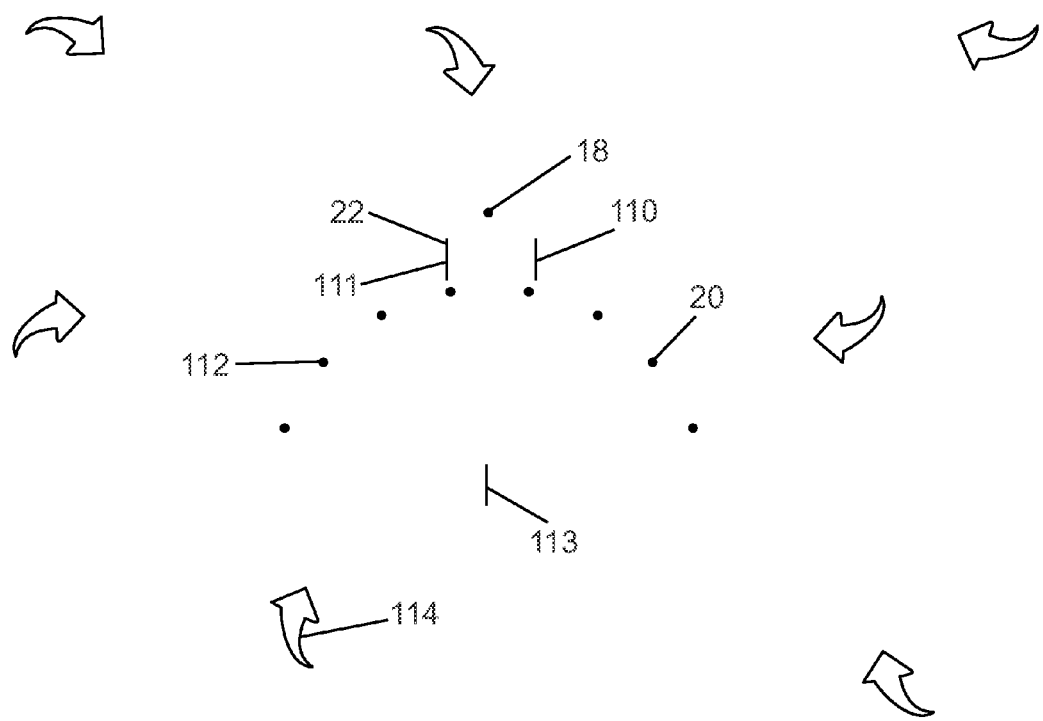

FIG. 19 is a plan view of a viewing surface with references for the activity of ski slalom racing.

Figure 20:
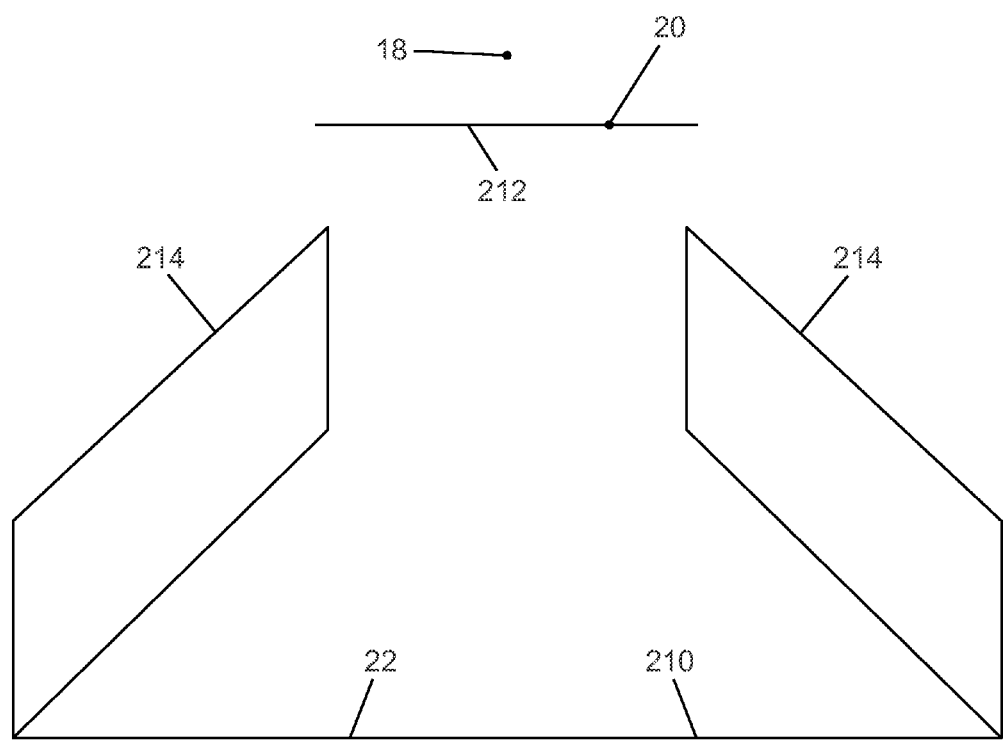

FIG. 20 is a plan view of a viewing surface with references for the activity of walking.

Figure 21:
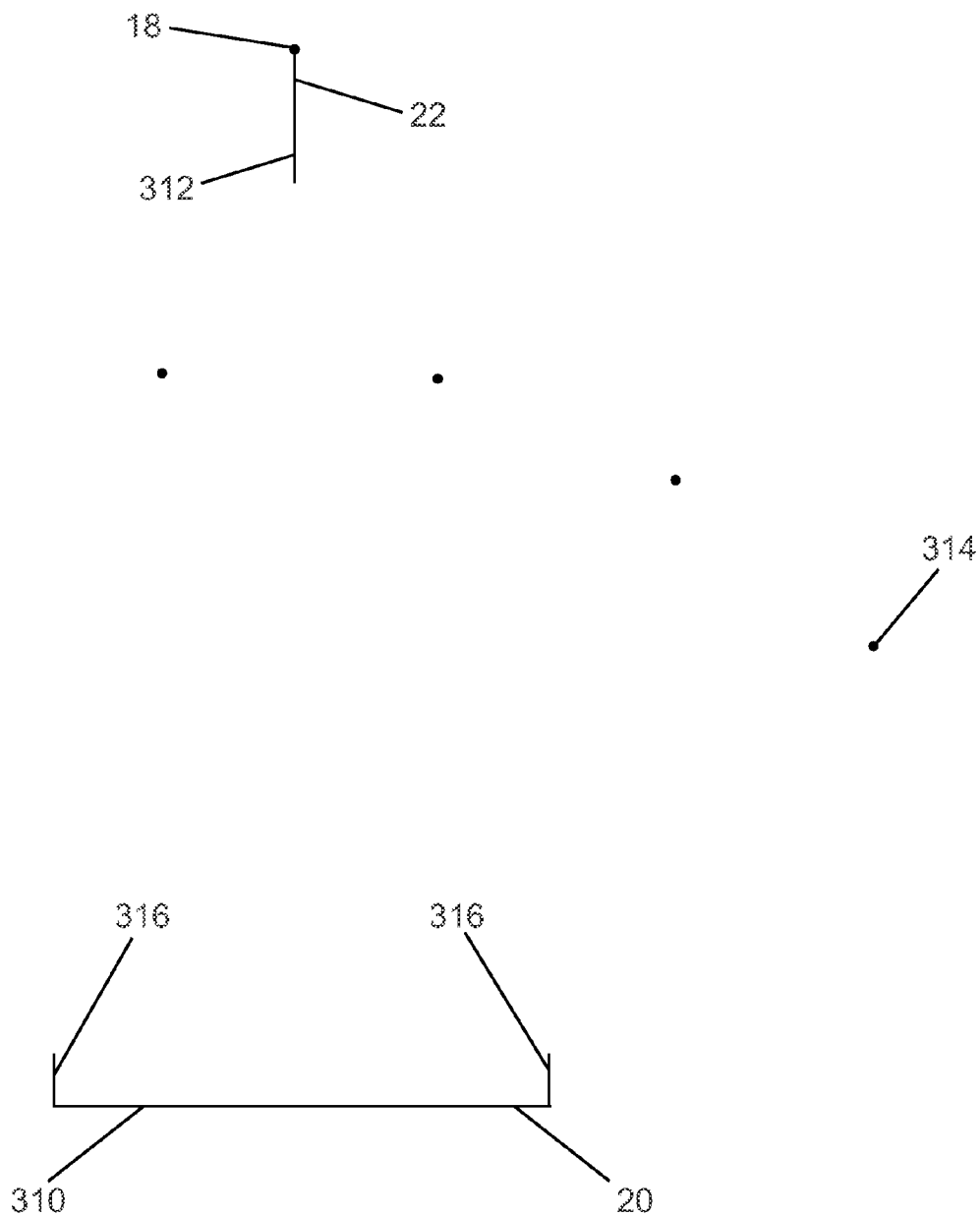

FIG. 21 is a plan view of a viewing surface with references for the activity of driving.

Figure 22:
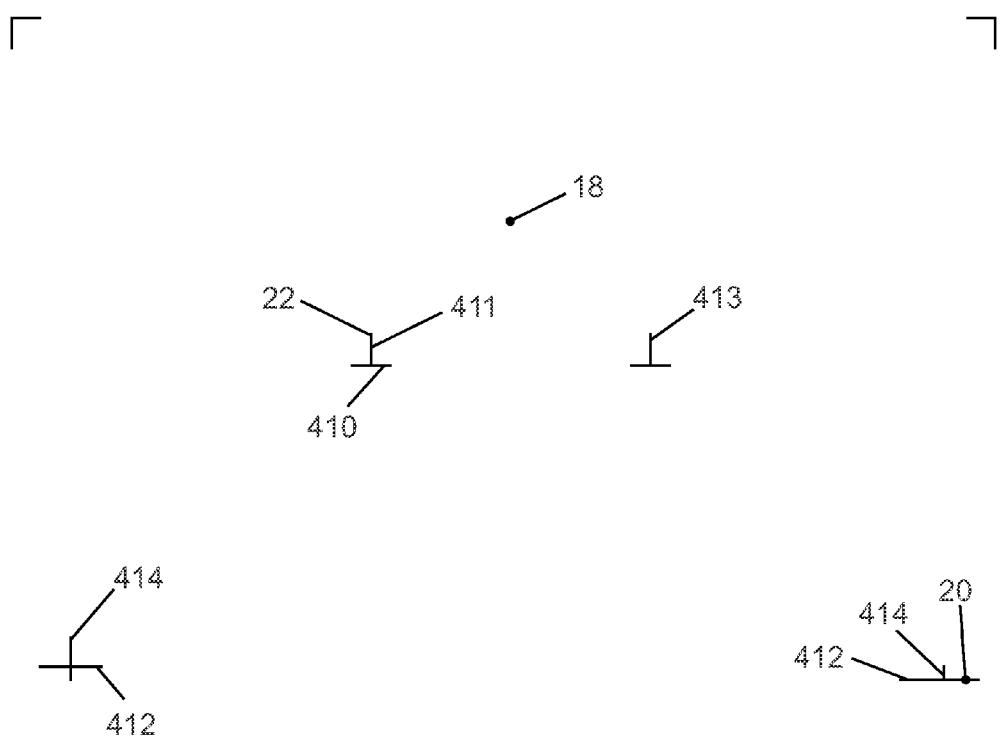

FIG. 22 is a plan view of a viewing surface with references for the activity of auto racing.

Figure 23:
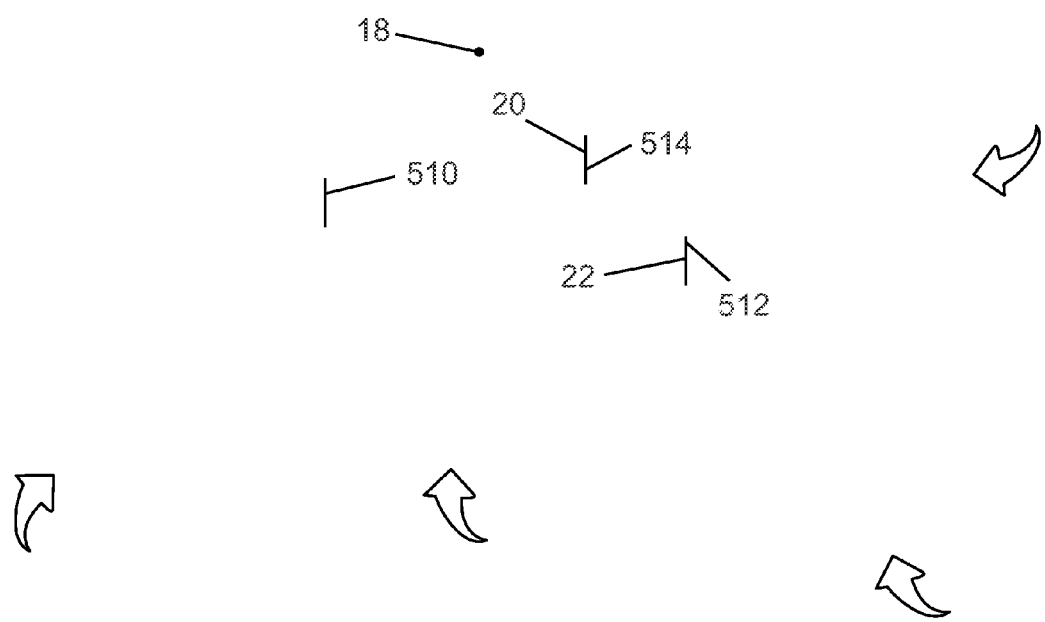

FIG. 23 is a plan view of a viewing surface with references for the activity of oval track car racing.

Figure 24:
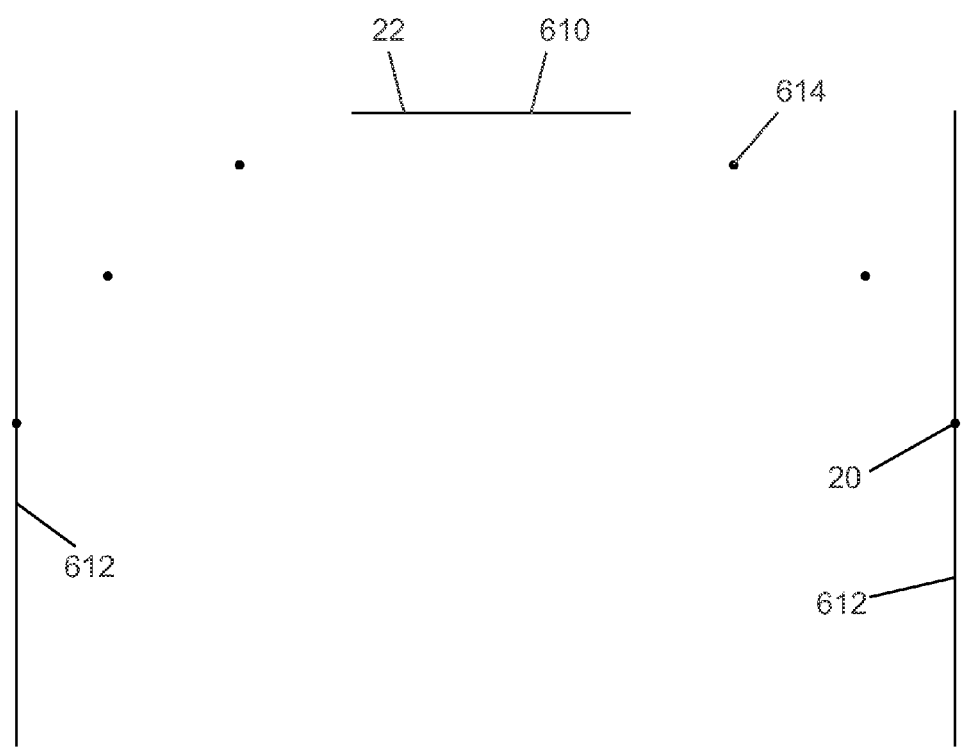

FIG. 24 is a plan view of a viewing surface with references for the activity of snow skiing.

Figure 25:
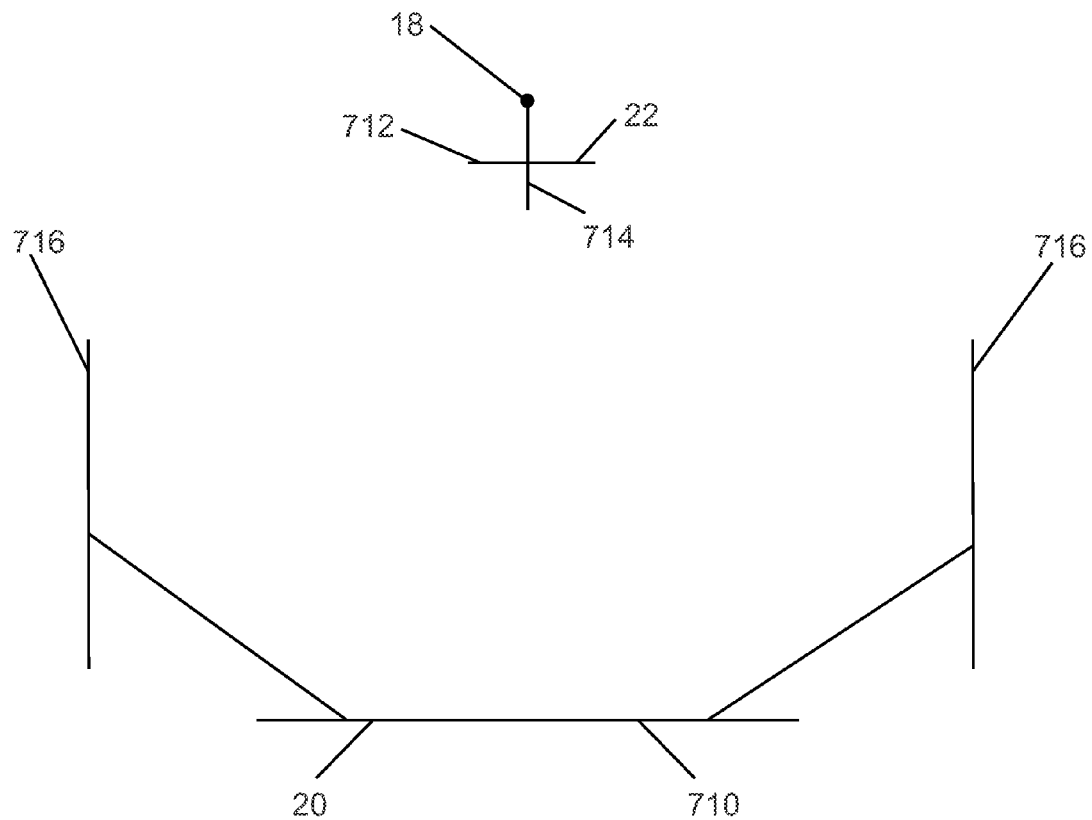

FIG. 25 is a plan view of a viewing surface with references for the activity of hockey.

Figure 26:
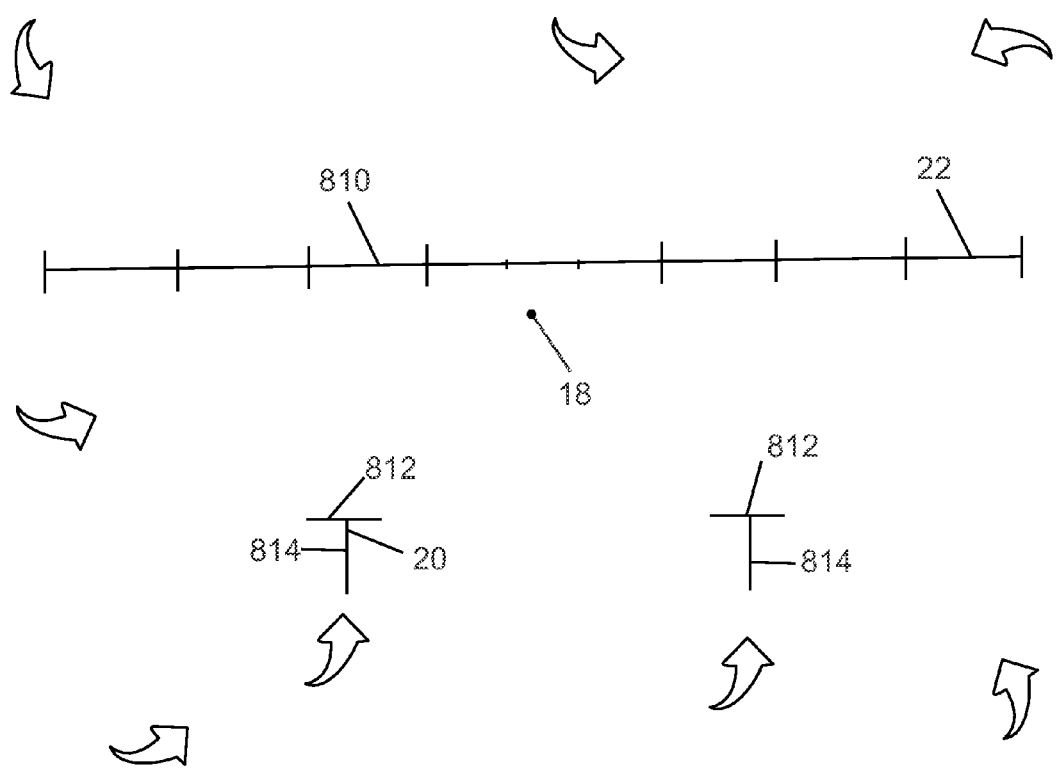

FIG. 26 is a plan view of a viewing surface with references for the activity of piloting a helicopter.

DETAILED DESCRIPTION

An Aid for Training Visual Skills Associates with a Selected Activity generally identified by reference numeral 10, will now be described with reference to FIG. 1 through 26.

Figure 1:
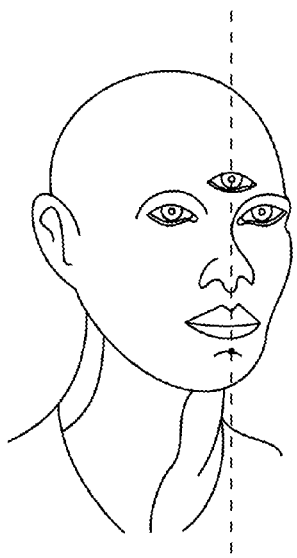
FIG. 1 is a perspective view of a person's face with a third eye reference point and a chin reference point.

The Theory Behind the Training Aid 1.0 Planes of Balance Reference Box 1.0.1. Look at your face in a mirror. Between your eyes and slightly above them, where an eye would be if you were a Cyclops is your imaginary third eye. FIG. 1

Figure 2:
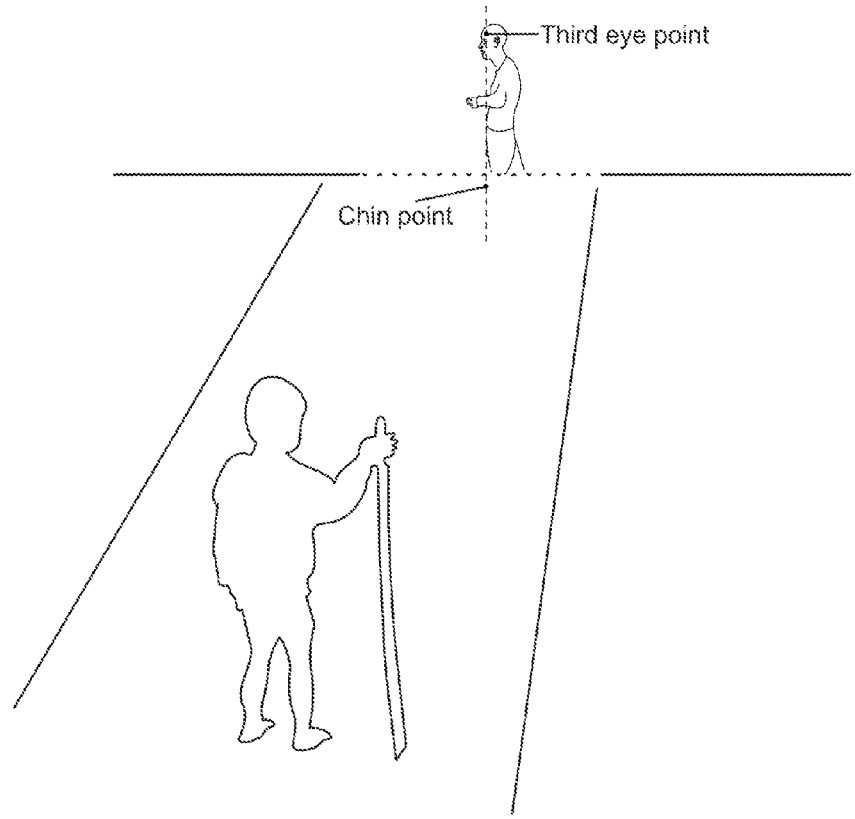
FIG. 2 is a top plan view of a third eye point, chin point and image of a person as it should be imagined on a horizon

1.1. Using your imagination, stand on a deserted road, and look to the furthest horizon you can see. Place, as a point on the horizon, your third eye. Have it just hovering over top of the horizon. FIG. 2

1.1.1. Again look in the mirror, and see a point in the center of your chin. It should be directly below the third eye point. FIG. 1

1.2. Aim the chin point to the horizon, but just below the horizon and in line with the third eye point that you have imagined on the horizon. FIG. 2

Figure 3:
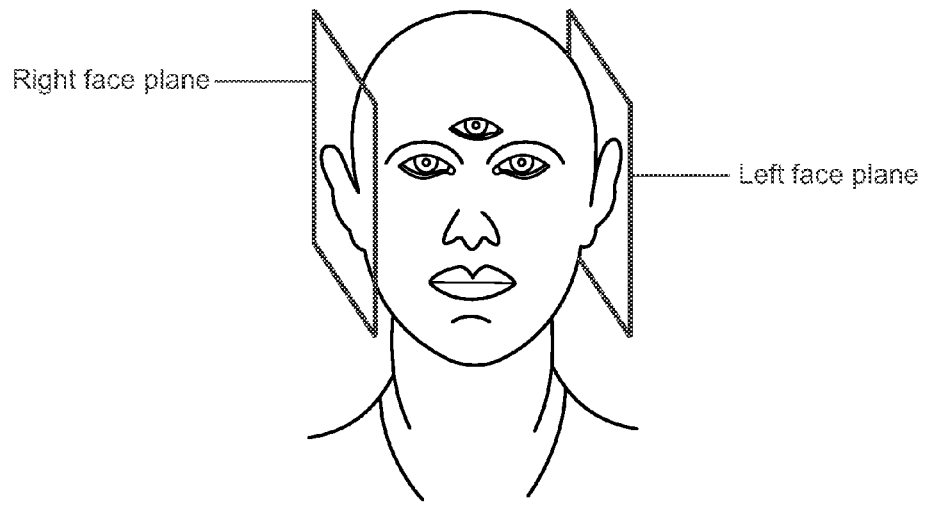
FIG. 3 is a front elevation view of a person's head showing the right face plane and the left face plane.

1.3. In the mirror, observe the right side of your face, and see from its widest point, a perfectly vertical line that forms on the outside of your face and boarded by the top of your head, and the bottom of your chin. This line is called the right face plane. FIG. 3

1.4. Do the same as above in 1.3, but for the left side of your face, called the left face plane. FIG. 3

1.5. Place your image of yourself on the horizon, and now resize the third eye point to the top of the head of your image, and the chin point at the feet of the image you imagine yourself to be. Note that the further the distance you are to the horizon the smaller your image will be of yourself. The same holds true if you are close to the horizon, your imagined image will be larger than if viewed from a distance. FIG. 2

Figure 4:
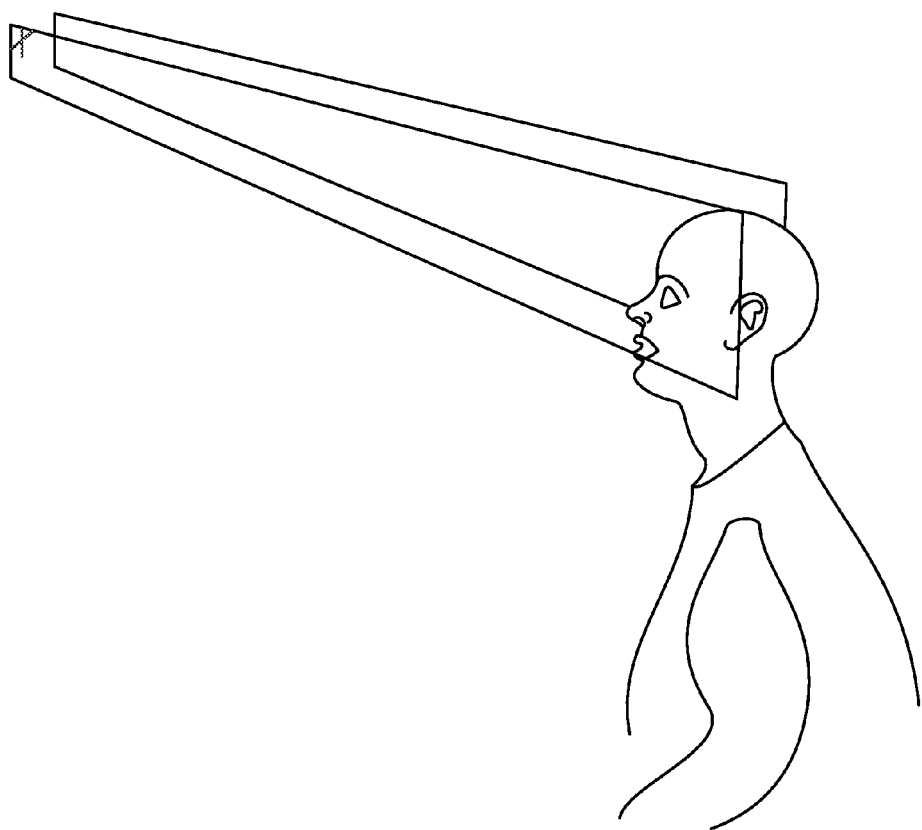
FIG. 4 is a side elevation view of a person showing references as imagined on a horizon.

1.6. Using the image of yourself shown in FIG. 2, place now the right facial plane on the outer most point of your out stretched arm on the left side of your image on the horizon. Note that the length of the face plane is the same height as your image on the horizon. FIG. 4

1.7. Do the same as the above for the left face plane. FIG. 4

1.8. Using your image of yourself on the furthest horizon point and with the above points overlaid against yourself, place a horizontal line than runs from the navel of your body and place it against the true horizon that you see. FIG. 5

1.9. You now should have an outline of your imagined being placed on the horizon that is some distance in front of you. On it are several reference points. The first at the center of your head on the very top is the third eye point. The second located at the bottom of your image on the horizon just below your feet is the chin point. The third is the right face plane located on the left side of the image that is facing you. The fourth is the left facial plane on the right side of the image that is facing you. The fifth is a horizontal line that runs through the navel of the image that is facing you and all should size and correspond to the true horizon and the imagined vertical size of you at that distance. FIG. 5

1.10. Lastly in this segment is the pendulum line. This line extends from the third eye point past the chin point on a vertical point and has a length of twice the height of your being that is imagined at distance, at its bottom most point place a small inverted triangle. This line is different from the others as it moves or pendulums from a pivot point at the third eye point. FIG. 5

1.11 Operation of the Planes of Balance Reference Box 1.11.1. A body in motion is subject to the laws of physics. Key for athletes in motion are 5 planes of balance governing spatial stability. By using the Balance Reference Box overlaid against the athletes line of momentum the athlete has an inherent ability to visualize how he/she needs to balance in the near future.

1.12. In operation the Planes of Balance Reference box allows two key advantages to the athlete. The first being to understand how they need to balance against a near horizon event, the second how to balance against a distant horizon event while simultaneously balancing on or against a non-level or unstable surface while in motion.

1.12.1. Balancing on a Near Horizon

By placing the Planes of Balance box against a distant horizon the athlete by using peripheral vision skills is able to sense what actions he/she are needing to use in order to balance against an environment by feel and spatial awareness in real time as the athlete is in motion and up to 3 seconds ahead of the athlete while in motion.

1.12.2. Balancing Against a Distant Horizon

By using focal vision skills locked on the third eye point that is superimposed against the distant horizon, and by using the above peripheral vision skills to balance on or against a near environment the athlete is able to understand what they need to do in terms of short term balancing actions, and comprehend balance actions in the near future, and gain a sense of equilibrium by understanding the entire balance envelope in terms of time and distance.

1.13 Key Aspects

Key in operation are Third Eye Point, fixated on the intended line of momentum. The waist horizon line located at the distant horizon, and the Pendulum line.

1.13.1. In operation the Third Eye point remains fixed, while the other two lines do move or provide reference to key aspects of motion.

1.13.2. The Waist Horizon line stays horizontal at all times with respect to the vertical line that forms between the Third Eye point, and the Chin Point. It could be said that the waist horizon line is at right angles to the vertical Third Eye point and the Chin Line. In operation one end or the other of the Waist Horizontal line either touches or comes close to touching the real horizon as the athlete moves with motion, depending upon severity of the comparison slope. By unconsciously measuring the difference in the real horizon, and the always level Waist horizon, the athlete gains insight into vital lateral, and torsional balancing information. FIG. 5

1.13.3. The Pendulum line always remains vertical. As the athlete is in motion he/she is given information pertaining to vertical, and lateral, balance planes. FIG. 5

1.13.4. By combining the two against a distant Third eye point that provides reference for depth perception, the athlete is able to understand by comparison, rotational, and fore aft balance indicators. FIG. 6

1.14 Visualizing the Planes of Balance Reference Box

With the above draw all lines in a bright florescent line in your mind. Bright pink if you are near sighted. Bright green if you are far sighted. As you get comfortable with using the Balance Reference Box, gently fade the intensity of the lines in both brightness, and in thickness leaving just a very thin, very faint line that allows you to anticipate your needs for the future. Note that at a moment's notice you can instantly brighten any line you chose in an aid to better understand your surroundings.

2.0 Momentum Triangle

In an effort to better understand the exercise the athlete needs a greater frame of reference.

To that end an additional series of mental exercises are enacted. These exercises will assist the athlete in understanding their perspective in motion. By linking the athlete's awareness of their physical being, but also their mental and emotional tendencies, certain psychological traits can be identified and massaged into higher levels of performance. To this end the athlete truly understands how best to manage their efforts in the field of competition. In order to do so the athlete is asked to view themselves in a new context.

2.1 Application of the Physical Body to the Momentum Triangle 2.1.1. Athlete considers the Balance Reference Box against the furthest horizon he/she can see. In an effort to understand depth perception and distance, the athlete imagines a line originating from their own Third Eye all the way to the Third Eye Point that hovers just above the furthest horizon. FIG. 7

2.1.2. For the sake of description purposes consider this line to be on a North/South orientation. This line is called Line of Momentum Targeting Line.

2.1.3. Using this roughly horizontal line, the athlete should be aware of the both the Line of Momentum, and the Pendulum Line, which correspondingly is roughly vertical. FIG. 7

2.1.4. To gain a better insight into positioning of their bodies and the various reference points, the athlete should extend the vertical Pendulum Line to the ground and have it fall just ahead of their feet.

2.1.5. From this point the athlete imagines a line that forms parallel to the Waist Line in the above mentioned Planes of Balance Reference Box. This line should run at right angles to the Line of Momentum Targeting line and subsequently be on an East/West orientation, but located on the ground. This line is called the Base Line. FIG. 8

2.1.6. Then have the athlete place their big toes just touching the Base Line, (East/West) and then have their feet apart with even space on either side of the inside of their feet and the Line of Momentum Targeting Line (North/South). They should have developed a "bulls eye" with their toes just on the inside corners of the South West quadrant and on the inside of the South East quadrant. FIG. 9

2.1.7. The athlete then needs to extend the East/West or Base Line out to the sides again at a right angle to the North/South Line of Momentum Targeting Line. At whatever distance the athlete perceived as the measurement from themselves to the Third Eye Point, have them extend this distance out to each side. At this point, have the athlete connect the ends of the Base Lines to the Third Eye Point forming an equilateral triangle. These lines are called triangle lines. This triangle is known as the Momentum Triangle. FIG. 9

2.2 Sizing of the Momentum Triangle 2.2.1. Relative to visibility, the Momentum Triangle does change its shape in terns of area. The greater the visibility, the larger in area the Momentum Triangle becomes, subsequently with reduced visibility, the smaller its area becomes. In time the athlete learns to move the shape and size of the momentum Triangle in an elastic fashion. FIG. 9

2.3 Shape of the Momentum Triangle 2.3.1. As the athlete uses the Momentum Triangle it becomes obvious that external objects intrude into the shape of the Momentum Triangle. Large objects such as buildings, trees, or mountains do affect its shape. In time the athlete learns not to be distracted by such objects as they do not impact the operation of the Momentum Triangle. FIG. 9

2.4 Body Lines and the Momentum Triangle 2.4.1. The subject is standing on the base line in the appropriate manner. As the subject focuses on the Third Eye Point, they envision as series of angles originating from their body and terminating at various points on the outside of the Momentum Triangle.

2.4.2. Starting at the knees a line originates from in between the kneecaps that fall on the extended Pendulum Line. From a reference point of view and to better understand the orientation of the Knee Line; consider that in terms of the Line of Momentum Targeting Line, and the Base Line that lie at right angles to each other. The Knee Line is at 70 degrees rather than the Base Line being at 90 degrees in relation to the Line of Momentum Targeting Line. One line extends in this fashion to the right side of the Momentum Triangle; another extends to the left side of the Momentum Triangle. FIG. 10

2.4.3. Waist line originates again on the Pendulum Line but on the center of the body 2 inches below the navel. From there it extends to the outside of the Momentum Triangle at a 50 degree angle from the Base Line. As above, two lines extend from the waist point at a 50 degree angle from the Line of Momentum Targeting Line, meeting the outside of the Momentum Triangle. FIG. 10

2.4.4. The Shoulder Line originates from the Pendulum Line but on a horizontal level with the tops of the shoulders. These two lines extend to the outside of the Momentum Triangle as well. They have a 30 degree orientation from the Line of Momentum Targeting Line. FIG. 10

2.4.5. The Face Lines extend from the sides of the face as described in the Planes of Balance Reference Box and meet the outside of the Momentum Triangle. They have no specific angle as do the other physical reference points. FIG. 10

2.5 Using the Body Lines 2.5.1. As the athlete sets in motion they imagine all lines glowing a faint fluorescent pink or green. As the athlete turns their head to place the Third Eye Point and then the subsequent Line of Momentum Targeting Point on location in which they wish go, and as the Momentum Triangle expands or contracts to the appropriate size, and as the athlete enables the Body Lines to meet to the outside points on the Momentum Triangle, these Body Lines overlay against or on various naturally occurring land marks giving the athlete vital reference indicators. FIG. 11

2.6 Using the Momentum Triangle 2.6.1. As the athlete engages in motion his/her path inevitably changes due to the nature of the activity they find themselves engaged in. The best use of the Momentum Triangle is an aid to better understand where it is that the athlete needs to go, what obstacles create an interruption to the most efficient line in getting there, and what physical forces they need to overcome to maintain an optimal pathway.

2.6.2. In an effort to move the Momentum Triangle to the desired location one moves their eyes first to the desired location, then moves their head simultaneously as they have identified the Third Eye Point. FIG. 11

2.6.3. As the head swivels to the desired location, the eyes track the Third Eye Point, and immediately focus, to create the Line of Momentum Targeting Line; instantaneously the rest of the Momentum Triangle is formed and sized to the appropriate shape. FIG. 12

2.6.4. As the athlete understands the path they must take, they also understand by use of the Planes of Balance Reference Box, the implications their line has against the laws of physics and tilt, twist, and generally keep level their head to balance against the forces they perceive will happen on the line or path they have chosen as being optimal. This presets the body to balance against forces that are several seconds away giving the athlete an ability to better understand what forces to anticipate against. FIG. 12

2.6.5. If the pathway follows more than one easily seen direction change, the head tilts against the perceived forces the furthest from the current location from the athlete. FIG. 12

2.6.6. If the pathway is very long in duration or obscured in any way the athlete keeps his eyes fixed at the furthest point observed on the desired line with the head tilted against the perceived forces that the athlete is currently engaged in. FIG. 13

2.6.7. If the path way is overlaid on a very long turn that is obscured in such a way that the athlete is unable to maintain focus and concentration on the desired line, the athlete needs to shorten the focus point to a location that is on the desired line, but is unobstructed. FIG. 13

2.6.8. When the line is obscured and if the athlete is unable to extend his Line of Momentum Targeting Line, the athlete needs to orient his/her head in such a way as to create the Balance Reference Box against the desired distant location. FIG. 13

2.6.9. If the line is still obstructed, with the above two tactics do not provide the desired information to the athlete, the athlete needs to change his/her focal point and metal concentrative efforts to one of peripheral vision.

2.7 Changing from Focal Vision to Peripheral Vision 2.7.1. If and when the athlete is using the EyeQ process it is inevitable that the line the athlete is traveling on will be completely obscured. With either prior knowledge of the line, or with an understood outcome for the athlete's actions when the athlete is in motion, different vision tactics are in order.

2.7.2. In order to best process the visual information the athlete has at hand it is best for an order of visual skills to be acted upon.

2.7.3. The athlete first uses Third Eye Point targeting as previously described against the furthest distant view point, or in the case of a obscured view point, against a previously engaged view point (memory skills) or imagined view point (using other key reference points to provide a context for the Third Eye Reference Point) FIG. 12

2.7.4. Athlete then develops a real or imagined Planes of Balance Reference Box to the desired location at the speed of thought. FIG. 13

2.7.5. If the line is still obscured, the athlete then applies the two tactics to assist in line development, namely, shorten the Third Eye Focal Point on the desired line, and best intended head orientation to the perceived line, the athlete then switches from a hard focal point information process, to a Soft Focus Information Gathering Process. FIG. 13

2.7.6. The head is now held in a steady position that the athlete is best able to determine the line in moments to come. By softening the focus from a hard point to a non-focusable location on the perceived line, the mind is unable to use depth perception fine detail ability to provide information. In an effort to reduce or remove mind lock, the athlete then switches to peripheral vision skills to best determine objects, reference points, and items that provide planes of balance information. Also included but used on a reduced level are momentums targeting vectors, and depth perception skills.

2.7.7. The shape of focal vision can be roughly described as line of sight or laser beam in shape, and in size. It has the size of a thumb nail held at arm's length when sighted down your extended arm. The shape and size of peripheral vision can be described as oval and covers considerable cubic meters of area. FIG. 14

2.7.8. With the athlete holding their head in the best position imagined for the upcoming line events, and by switching to peripheral vision, the athlete is able to change their information gathering process in very short order. The primary purpose of this activity is to keep the athletes mind engaged in their current activity and not to become distracted in searching for meaningless activities that provide line based information. FIG. 10

2.7.8. It could be said that the athlete when trained can switch rapidly and frequently from Focal Vision skills to Peripheral Vision skills very rapidly, and very frequently in an effort to keep their momentum.

2.7.9. Additional skills in reshaping the Momentum Triangle and avoiding distraction may be used.

2.7.10. The first and foremost skill is the above mentioned process of holding the Momentum triangle fixed on the furthest point the athlete can see and using peripheral vision skills with practiced mental and emotional skills to hold distraction at bay.

2.7.11. The biggest contributor to distraction and loss of Momentum Triangle application is a naturally occurring blind spot that limits information between the half way point of the Shoulder Line and the Face Plane Zone and the half way point of the Hip Line and Shoulder Lines. FIG. 15

2.7.12. As these lines are more perceived by the mind than actual constructs of the eye mechanism it is easy to be distracted by information that is expected to occur in a timely manner and not arrive due to the noted blind spots.

2.7.13. If the line that the athlete needs to take substantively intrudes into this blind area simply by shorting the focal point of the Third Eye point to a location that allows for complete and unobstructed observation of the line while holding the head steady to the previous or furthest Third Eye Point.

2.7.14. Second is changing the focal vision skill set to one of shortening the focal point as above, and additionally switching to peripheral vision soft focus skill sets.

2.7.15. Finally if the above still does not resolve the issue of obstruction and the Momentum Triangle use a series of leaps to build in sequence, a series of Momentum Triangles as the visual situation improves. FIG. 16

2.8 Linking the Momentum Triangle and Additional Athlete Abilities 2.8.0 Momentum Triangle and Mental Development 2.8.1. Not only does the Momentum Triangle provide information to the body on a physical aspect, it can be used to provide information to the athlete on mental and emotional aspects as well. This information can be overlaid on the Momentum Triangle and used to describe in a sequential order various zones of influence that the athlete encounters while in motion. It is the intention of this work to provide additional assistance available to the athlete that enables them to take advantage of their innate abilities and focus them in to secondary actions that assist them in developing the optimal line.

2.8.2. Application of Momentum Triangle to mental efforts identifies that the metal being of the athlete while doing an action needs to certainly be engaged, and in tune with current events. In fact the better known the activity by the subject, and a complete understanding of the environment overlaid against the speed of the events can greatly contribute to the overall success of the athlete in action.

2.8.3. As the Momentum Triangle is imagined and engaged by the athlete, additional information can be brought to attention that will aid the athlete in understanding in what sequence metal activities need to occur. Bringing attention to the outside shape of the momentum triangle in a sterile environment, consider the lines emanating from the athlete extending to the outside of the Momentum Triangle. These lines extend from the athlete and are known as the Base Line, the Knee Line, the Hip Line, the Shoulder Line, the Face Planes, and the Third Eye Line. FIG. 10

2.8.4. As we construct the Momentum Triangle and examine the areas or zones that divide the momentum triangle we can now bring our attention as to how we can link these zones to additional properties that athlete has at their disposal.

2.8.5. The following zones will have an application to metal abilities the athlete has and uses to help with line determination. They are either innate or easily trained for athlete use.

2.8.6. The zone that occurs from the Base Line to the Face Plane Lines has an application to Sub Conscious and or automatic response learned activities with respect to aspects of mental ability. FIG. 10

2.8.7. The zone that occurs from the Face Plane Lines to an area that surrounds and includes the Third Eye Point is in the conscious or cognitive mental efforts. FIG. 10

2.8.8. This triangular shape that comprises of the Base Line and the Face Plane Lines are not only facing forward, but also do extend backward from the athlete and have a link to mental capacity used primarily in memory and memory recall role. This area is much smaller in comparison to the total area of the Momentum Triangle, and is linked to the conscious mental effort. Its size and degree of detail of composition is relevant to the importance of memory recall and current action implementation. FIG. 17

2.8.9. Additional areas also extend from the athlete in a vertical plane if the athlete finds themselves in a three dimensional environment. FIG. 17

2.9 Momentum Triangle and Emotional Development 2.9.1. Using the Momentum Triangle as a reference and examining the area between the Base Line and the Knee Line and linking this area to an emotional aspect of the athletes being, it is assumed that this area contains the emotional response of the Flight or Flight mechanism and surprise response. Specifically the anxiety side of the flight or fight or fear based response actions of the surprise mode. FIG. 10

2.9.2. The area between the Knee Line and the Hip Line contains the aggressive response to the flight or fight response. Relevant to the amount of light available to the athlete, and given the degree of knowledge of the activity the athlete has, the surprise mechanism is more or less engaged due to the amount of awareness that peripheral vision offers. FIG. 10

2.9.3. Between the Hip Line and the Shoulder Line on the Momentum Triangle is the zone of automatic response and/or action determination biased against the level of knowledge the athlete has at his/her command of the activity, coupled against and the comparison of the environment they find themselves in. FIG. 10

2.9.4. The zone between the Shoulder Line and the Face Planes Lines house the resolution, and execution of expectation the athlete has in response to their environment. This may be in response to an action or a predetermined series of events the athlete is in anticipation of. FIG. 10

2.9.5. It should be mentioned that all of the above zones are in the athlete's sub-conscious or automatic response mechanisms with respect to the mental aspect of the athletes being. FIG. 10

2.9.6. The remaining zone is related to the cognitive or conscious metal efforts and in it resides the result and evaluation of observed actions the athlete has already put in motion. It is very closely linked to the athlete's sense of ability, and the depth of understanding of the activity the athlete is engaged, and the motivation of personal attachment to an outcome the athlete already has enacted upon. FIG. 10

3.0 Momentum Triangle and Observed Athlete Development 3.1. Evaluation of athletes while they use the momentum triangle has led to several conclusions.

3.1.1 Athletes who use the Momentum triangle have much lower levels of anxiety while operating in their chosen activity.

3.1.2. While using the Momentum Triangle, athletes reported being much more aware of their surroundings.

3.1.3. Athletes report of being in the "zone" sooner and if they become distracted they find a much shorter time in getting back into the "zone".

3.1.4. Athletes report slower and shallower breathing rates.

3.1.5. It has been observed that heart rate is lowered by as much as 30% (dependent upon activity)

3.1.6. All athletes reported a reduced work load 3.1.7. Athletes indicate a much sharpened state of readiness 3.1.8. Evidence suggests that use of the Momentum Triangle during injury recovery can shorten recovery time.

3.1.9 All athletes report a much higher level of mental clarity 3.1.10. All athletes indicate a more fluid, and earlier ability to use anticipation.

3.1.11. While discovering the above athletes indicated they were much more accurate with their efforts of anticipation.

Applying Theory to Training Aids

There will now be described how the Theory described above can be implemented in the form of an aid for training visual skills by selecting features from the Planes of Balance Reference Box and the Momentum Triangle described above. When doing any type of activity where the user wishes to better understand their environment while in motion, and consider the implications of Balance, Equilibrium, Stability, and Situational Awareness, on or against their projected path, it is often advantageous to move in a certain way or focus on a specific objects or locations. The training aids described below are intended to serve that function.

Referring to FIG. 18, an aid for training visual skills associated with a selected activity 10 includes a body 12 that has a mounting 14 for attaching to a head of a wearer and a transparent viewing surface 16 through which the wearer observes his or her environment. The body 12 may be a pair of glasses or a visor or any other type of body 12 that may be mounted to the head of the wearer. Activity specific balance reference indicia from the planes of balance reference box and activity specific momentum reference indicia from the momentum triangle are present on transparent viewing surface 16.

Practical Applications:

Ski Race Slalom

Build the Momentum Triangle:

Darken the Third Eye Point to either bright pink or bright green

Place two vertical lines on the intersection of Momentum Triangle and the Face Plane Lines. They should be as long as the skier is in height when viewed from the next horizon that they are moving toward.

Place a vertical Line where the Pendulum Line touches the Base Line it should be as long as the above two lines.

Darken all Points where the Knee Line, Hip Line, Shoulder Line, and Face Plane Lines touch the outside of the Momentum triangle Erase all but the above Application of the Momentum Triangle:

Aim the Third Eye Point to the furthest Horizon that is on the race course

The outside markers are used for Depth Perception, Vertical, Fore Aft, Lateral, Torsional, Lateral and Rotational Balance. They serve also to provide timing aids whilst skiing As you make a right turn, and when the right vertical line is on the gate in front of you, start another turn. Repeat the process while turning to the left.

Referring to FIG. 19, an aid for training visual skills associated with a specific activity 10 may be created for the activity of slalom racing. Activity specific balance reference indicia 22 include a third eye focal point reference 18 and parallel spaced left side plane 110 and right side plane 111 for alignment with a slalom gate. Activity specific momentum references 20 include a momentum line 113 pointing between parallel spaced left side plane 110 and right side plane 111 references and broken triangle lines providing a graduated turning reference 112. The activity specific visual references 20 may also include at least one direction of momentum reference 114.

Seniors Triangle

Build the Momentum Triangle

Then build another that is 50% bigger and surround the first with it

Connect vertical lines from the two Triangles at the base lines, and Shoulder Lines.

Connect the tops of these lines so as to form a railing type of structure

Erase the outside Lines of the lower or inner, and outside or upper Momentum Triangle from the Shoulder Line to the Third Eye Point, and all of the Body Angle Lines Keep the upper Third Eye Point Draw in a horizontal line that extends from the upper shoulder line to the opposite upper shoulder line Application of the Seniors Triangle Seniors "feel" as though they are in a narrowing corridor that seems to have a slight elevation gain Because there is the illusion of elevation gain they must step a little higher with their feet avoiding a shuffle type of fall The image has an illusionary railing out to the sides getting the seniors to widen their balance movements The Third Eye point serves to aim their momentum The horizontal line below the Third Eye Point serves to provide horizontal balance reference.

Referring to FIG. 20, an aid for training visual skills associated with a specific activity 10 may be created for the activity of walking. The activity specific balance reference indicia 22 include a third eye focal point 18 and a horizontal alignment reference 210 to indicate a floor.

The activity specific momentum references 20 include a base line 212 and a pair of converging triangle lines 214 that converge toward the focal point reference 18.

Road Car Safety Screen

Build the Momentum Triangle:

Darken the Third Eye Point to a bright pink if near sighted, bright green if far sighted Extend the Pendulum Line to the length the driver is when standing on the nearest horizon while they are seated in the car Darken the intersection points between the outside of the Momentum triangle and the Knee Lines, Hip Lines, Shoulder Lines, Face Lines Darken the horizontal line in the same fashion as above the Base Line but its length is determined by the length of the car/truck hood of the vehicle the driver is operating. At its ends draw I two small vertical lines that measure one/fifth of the length of the above Pendulum Line Erase all but the above on the Momentum Triangle Operation of the Road Car Safety Screen:

The Driver aims the Third Eye Point to the indented point of where they would like to have their momentum go while looking at the furthest horizon The Driver uses the Pendulum Line to keep Lateral and Torsional stability by comparing it to other fixed outside vertical lines The Driver uses the horizontal Base Line with the vertical tabs to balance his/her actions to rotational and torsional forces The Driver uses the distance between the Third Eye Point and the Base Line for fore aft balance forces Using the intersection points described in step three above the driver uses these points as timing markers for outside land marks and his/her own actions to the vehicle Referring to FIG. 21, an aid for training visual skills associated with a specific activity 10 may be created for the activity of driving. The activity specific alignment balance references 22 include a third eye focal point 18 and a pendulum line 312 depending from the third eye focal point 18. The activity specific momentum references 20 include a base line 310, indicia 316 at opposed ends of the base line to provide a peripheral vision reference and a broken triangle line reference 314 to provide a graduated turning reference.

Race Car Road Course

Place the Third Eye Point at the three/quarter point on the pupil.

Draw in faintly the Momentum Triangle

At the intersection of the Momentum Triangle and the Hip Lines on both sides of the Momentum Triangle draw in an inverted T shape, called Stability Markers The height of the vertical component of the inverted t is the height of the athlete at the Third Eye Point and the Chin Point while the Momentum Triangle is place on the furthest horizon. (Point 1.5; document Application of the Eye Q Process)

The length of the horizontal line on the inverted t is twice the height of the above vertical line.

Erase all lines except for the Third Eye Point, and the two Stability Markers

Application of the Road Car Shield:

Place the Third Eye Point where you want the cars momentum to go as early as possible as you enter turns or exit turns, as a general rule of thumb, at least 7 to 15 seconds ahead of the car at speed. (Focal vision skills)

On turn entry, the steering wheel must be stable before the inside Stability marker reaches the Apex. (Peripheral vision skills)

Use the Stability Markers on both sides of the Momentum Triangle to reference outside vertical and horizontal lines in an aid to balance the car during the turn. (Peripheral and Wide Angle vision skills)

Once the car is stable at generally a point one to two car lengths before the inside Stability Marker touches the apex apply the throttle. (Focal, Peripheral, and wide Angle vision skills)

Referring to FIG. 22, an aid for training visual skills associated with a specific activity 10 may be created for the activity of auto racing. The activity specific balance reference indicia 22 include a third eye focal point 18, a horizontal line 410 to indicate a road surface and parallel left side plane 411 and right side plane 413 lines. The activity specific momentum references indicia 20 include a base line 412 and a pair of vertical peripheral vision references 414.

Short Track Oval

Place the third eye point just above the meniscus line on the pupil; ideally it should be three/quarters up on the pupil Make this point a very bright florescent pink id near sighted, or green if far sighted Faintly draw in the momentum triangle with all lines At the left side of the momentum triangle at the intersection of the shoulder line draw a vertical line. This line is now called the Apex Balance Line This line should be the length of the athlete when they are standing at the apex of turn one/two and looking at where their brake point is Place a vertical line on the intersection of the face line and the momentum triangle but on the right side of the momentum triangle. This line should be as long as the above example.

This line is called the Brake Application Line

Place another vertical line, again on the right side of the momentum triangle to the same length as noted above but located at the waist line. This line is called the Throttle Application Line.

Erase all lines except for, Third Eye Point, Apex Balance Line, Brake Application Line, and Throttle Application Line.

Application of the Short Track Oval Shield:

Aim the Third Eye Point where you want the cars momentum to go as early as you can. Generally, as you enter a turn. At the latest, it will be at the turn out point on the opposite side of the track. Or mid track, on the opposite straight, will be the earliest you will aim the point. (Focal vision skills)

Use the first vertical line on the right, the Brake Application Line, as a brake timing marker to apply the brakes as you approach your predetermined brake point (Peripheral vision skills)

Turn the steering wheel so that the wheel stops moving at or before the line on the left, the Apex Balance Line, aligns itself with the predetermined apex. (Peripheral vision skills)

Use the second vertical line on the right, the Throttle Application Line, aligns itself with the predetermined throttle point. (Focal, Peripheral, and Wide Angle vision skills)

Referring to FIG. 23 an aid for training visual skills associated with a specific activity 10 may be created for the activity of oval track car racing. The activity specific balance reference indicia 22 include a third eye focal point 18 and parallel left side plane 510 and right side plane 512 lines. The activity specific momentum reference 20 includes a momentum line 514.

Ski Ride Safety

Build the Momentum Triangle:

At the Face Plane intersection points draw a horizontal line that connect the two points and extend to the outside of the Momentum Triangle Draw two long vertical lines that extend from the base line to the top of the Momentum Triangle, but are located on the intersection points of the Knee Lines, and the outside edges of the Momentum triangle Darken the Third Eye Point Darken the Pendulum Line Darken all points on the outside intersections of the Momentum triangle and the Knee Lines, Hip Lines, Shoulder Lines, and Face Lines Erase all but the above Application of the Ski Ride Safety Screen:

Aim the Third Eye Point to the furthest horizon you can see

Place the shorter horizontal line against a closer horizon to you for use of determining, rotational, lateral and torsional balance referencing Use the vertical Pendulum Line for rotational, fore aft, and lateral balance referencing Use the intersection points to determine depth perception, timing, and 3 D referencing information The two long vertical lines on the outside of the Momentum triangle are for anti-collision information; anything moving from the outside of these lines to the inside is a threat.

Referring to FIG. 24, an aid for training visual skills associated with a specific activity 10 may be created for the activity of snow skiing. The activity specific balance reference indicia 22 include a third eye focal point 18 and a horizontal alignment reference 610 to indicate a horizon. The activity specific momentum reference 20 includes a pair of peripheral vision reference lines 612 and broken triangle lines 614 providing a graduated turning reference.

Hockey Triangle

1. Place Third Eye point just above the meniscus line on the pupil
2. Place the Waist horizontal line on the meniscus line, it needs to be as wide as the pupil
3. Draw in the Knee line or a line that is 35 degrees from Base Line on either side of the extended Pendulum line
4. Even though there is no momentum triangle, where the knee line intersects with the outside of the Momentum triangle draw two vertical lines that are the height of the player when the player is standing on center ice, when someone is observing the player when they are standing on the goal line.
5. Draw in the pendulum line from the Third Eye Point down but its length is determined by comparing the player as they are standing on the opposite goal line while the observer is looking at the player while they are standing on the player's goal line. That measurement determines the length of the Pendulum Line
6. Bring your imagination to the invisible Momentum Triangle. At the Knee Line and where the Pendulum Line intersect draw a horizontal line the length of the players arms are while out stretched while you are in front of them.

Application of the Hockey Triangle:

Where the Third Eye point is where you aim the puck

The fixed small Pendulum Line is used to balance against all vertical lines on the ice, and arena The small fixed Horizontal line on the pupil meniscus is used to balance against all vertical lines on the ice, and arena The Player must keep three members of his team in the area between the Knee Lines, with their vision skills The vertical lines on the outside of the Knee Lines are for balance, anti collision, and depth perception of the Player and proximity of the boards The horizontal line at the bottom of the Hockey triangle is where the puck and the top of the blade of the stick are Referring to FIG. 25, an aid for training visual skills associated with a specific activity 10 may be created for the activity of hockey. The activity specific balance reference indicia 22 include a third eye focal point 18, a horizontal line 712 to indicate a blue line and a pendulum line 714. The activity specific momentum reference indicia 20 include a base line 710 which indicates the ice surface and a pair of vertical peripheral vision references 716.

Rotor Air Craft (Helicopters)

Build a Momentum Triangle:

Next build another so that they are on top of each other.

The orientation should be that both points just touch each other and the bases are at the top and the bottom with the points being in the middle. Overall it should roughly resemble an hour glass.

Darken the center point so as to form the Third Eye Point; it should be in the middle of the Momentum Triangles at their narrowest point.

Darken the inverted or upper Momentum Triangles intersection points of the outside of the Momentum Triangle, and the Knee Lines, Hip Lines, Shoulder Lines Draw a horizontal line at the intersection of the Face Plane points on the inverted or upper Momentum Triangle. This line should be twice the length of the Base Line length of a Momentum Triangle. This line is now called the Rotor Plane Line Extend the intersection points of the inverted Momentum Triangle to the Rotor Plane Line.

You now should have intersecting points from the upper Momentum Triangle and the Rotor Plane Line that comprise of the following, Base Lines, Knee Lines, Hip Lines, and Shoulder lines.

Carefully measure the distance between the Base Line, and the Knee Line on both sides of the Rotor Plane Line, and where the middle of these two lines are, draw in another line on both sides of the Rotor Plane Line. All lines should be at right angles to the Rotor Plane line, and are 1 centimeter in length.

Bring your attention to the lower or right side up Momentum triangle. At the intersection of the Knee Line points and the outside of the Momentum Triangle, draw a horizontal line that is parallel to the Base Line, its length should be 1.5 centimeters. You should do two of these, one for either side.

Draw now a vertical line from the above intersection point down to the Base line, again one on either side. These lines should be parallel to the Pendulum Line.

Erase all but the above

Application of the Rotor Air Craft Screen:

The Pilot aims the Third Eye Point to where they would like the aircraft's momentum to go.

The pilot uses the two lower T shapes for vertical, fore aft, lateral, torsional, and rotational planes of balance reference The pilot uses the rotor Plane Line as a depth perception guide for landing in confined areas.

Referring to FIG. 26, an aid for training visual skills associated with a specific activity 10 may be created for the activity of piloting a helicopter. The activity specific balance reference indicia 22 include a third eye focal point 18 and a horizontal alignment reference 810 to indicate a horizon. The activity specific momentum reference 20 include a base line 812 and a pair of momentum lines 814.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An aid for training visual skills associated with a selected activity, comprising:
    a body having a mounting for attaching to a head of a wearer and a transparent viewing surface through which the wearer observes his or her environment;
    activity specific balance reference indicia on the transparent viewing surface for visual alignment with the environment, the activity specific balance reference indicia is drawn from a planes of balance reference box and comprises a third eye focal point and at least one of a chin focal point, a horizon line, a left side plane, a right side plane, and a pendulum line, and the third eye focal point comprising an indicia to be aligned with the wearer's eyes and a momentum target; and
    activity specific momentum reference indicia to direct a visual focus of the wearer during movement, the activity specific momentum reference indicia is drawn from a momentum triangle and includes at least one of a face line, a shoulder line, a waist line, a knee line, base line, one or more momentum lines and triangle lines.

2. The aid of claim 1, wherein the body is one of a pair of glasses or a visor.

3. The aid of claim 1, wherein the triangle lines are broken to provide graduated turning reference.

4. The aid of claim 1, wherein the base line has marked ends to provide a peripheral vision reference.

5. The aid of claim 1, wherein arrows are provided as supplementary turning references.

6. The aid of claim 1, wherein:
    the selected activity is slalom racing;
    the activity specific balance reference indicia comprising:
        the third eye focal point; and
        parallel spaced left side plane and right side plane references for alignment with a slalom gate;
    the activity specific momentum references comprising:
    a momentum line pointing between the parallel spaced left side plane and right side plane references; and
    broken triangle lines providing a graduated turning reference.

7. The aid of claim 1, wherein:
    the selected activity is walking;
    the activity specific balance reference indicia comprising:
        the third eye focal point; and
        a horizon line;
    the activity specific momentum reference indicia comprising:
        a base line; and
        converging triangle lines that converge toward the third eye focal point.

8. The aid of claim 1, wherein
    the selected activity is driving;
    the activity specific balance reference indicia comprising:
        the third eye focal point; and
        a pendulum line depending from the third eye focal point;
    the activity specific momentum reference indicia comprising:
        a base line;
        indicia at opposed ends of the base line to provide a peripheral vision reference; and
        broken triangle lines to provide a graduated turning reference.

9. The aid of claim 1, wherein
    the selected activity is auto racing;
    the activity specific balance reference indicia comprising:
        the third eye focal point; and
        a horizon line;
        parallel left side plane and right side plane lines;
    the activity specific momentum reference indicia comprising:
        a base line; and
        peripheral vision references at opposed ends of the base line.

10. The aid of claim 1, wherein
    the activity is oval track car racing;
    the activity specific balance reference indicia comprising:
        the third eye focal point;
        parallel left side plane and right side plane lines;
    the activity specific momentum reference indicia comprising:
        a momentum line.

11. The aid of claim 1, wherein
    the activity is snow skiing;
    the activity specific balance reference indicia comprising:
        the third eye focal point; and a horizon line;
the activity specific momentum reference comprising:
   broken triangle lines providing a graduated turning reference; and
   peripheral vision reference lines.

12. The aid of claim 1, wherein:
the activity is hockey;
the activity specific balance reference comprising:
   the third eye focal point;
   a horizon line; and
   a pendulum line;
the activity specific momentum reference indicia comprising:
   a base line; and
   peripheral vision lines.

13. The aid of claim 1, wherein:
the activity is piloting a helicopter;
the activity specific balance reference indicia comprising:
   the third eye focal point; and
   a horizon line;
the activity specific momentum reference indicia comprising:
   a base line; and
   a pair of momentum lines.

* * * * *